C. M. SPENCER.
Machines for Making Metal Screws.
No. 5,836. Reissued April 14, 1874.
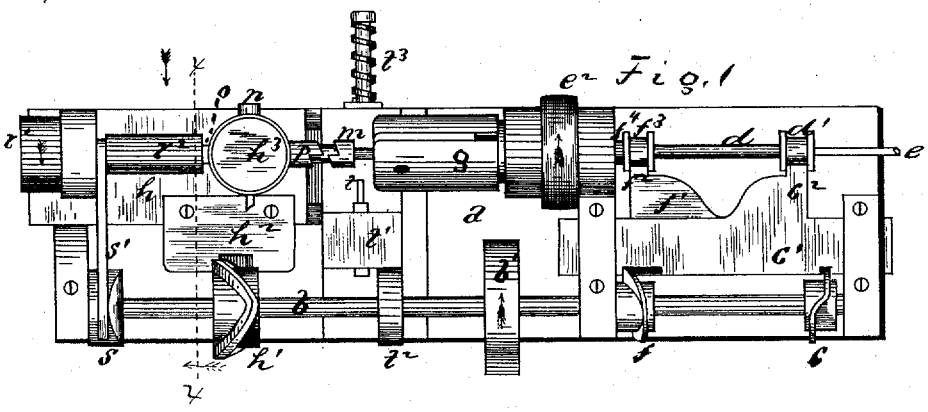
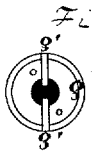
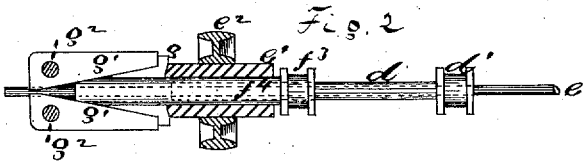
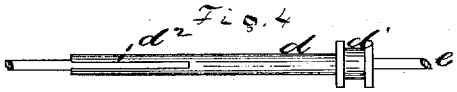
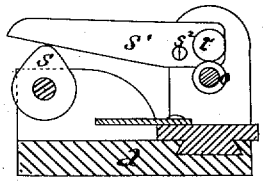
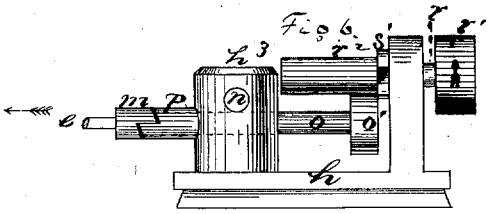
Witnesses.
John Pollitt
S. J. Simonds
Inventor
Christopher M. Spencer
By William Ed. Simonds
Atty.

UNITED STATES PATENT OFFICE.

CHRISTOPHER M. SPENCER, OF HARTFORD, CONNECTICUT.

IMPROVEMENT IN MACHINES FOR MAKING METAL SCREWS.

Specification forming part of Letters Patent No. 143,306, dated September 30, 1873; reissue No. 5,836, dated April 14, 1874; application filed November 29, 1873.

*To all whom it may concern:*

Be it known that I, CHRISTOPHER M. SPENCER, of Hartford, in the county of Hartford and State of Connecticut, have invented certain new and useful Improvements in Machines for Making Metal Screws, of which the following is a specification, reference being had to the accompanying drawings, where—

Figure 1 is a top or plan view of the whole machine. Fig. 2 is a view, in central longitudinal section, of the chuck made use of, and its immediate attachments. Fig. 3 is a view of the front end or mouth of the chuck. Fig. 4 is a detached view of the sleeve which grasps and feeds the metal rod of which the screws are made. Fig. 5 is a view of the machine in transverse vertical section on the dotted line *x x*, looking in the direction by the arrow on the line. Fig. 6 is a detached side view of what I term the "tool-carriage," from the point A, with reference to the whole machine.

The machine automatically makes screws off the end of a rod; and the invention consists in parts and combinations for producing the automatic movements of the machine, set out specifically in the clauses of claim at the end of this specification.

The letter *a* denotes the base of the machine, and *b* the main shaft, driven by a belt running on the pulley $b'$. On the main shaft is a cam, *c*, giving an intermittent reciprocating motion to the slide $c^1$, the nature of this reciprocating slide being indicated hereinafter by a description of the purpose it serves. An arm, $c^2$, upon the slide $c^1$ engages with the collar $d'$ upon the sleeve *d*, and causes this sleeve to reciprocate with the slide $c^1$. Through the longitudinal center of the sleeve *d* passes the rod *e*, from which the screws are made. The front end of the sleeve *d* has a slot, $d^2$, and is sprung together so as to embrace the rod *e* tightly enough to make this rod move longitudinally with the sleeve, when the action of the sleeve is not interfered with. On the main shaft *b* is a cam, *f*, giving an intermittent reciprocation to the slide $f^1$, having an arm, $f^2$, engaging with the collar $f^3$ on the sleeve $f^4$, so that this sleeve is reciprocated by the cam *f*, the nature of this reciprocation being indicated hereinafter by a description of the purpose it serves. The sleeve *d* runs inside the sleeve $f^4$, and the sleeve $f^4$ inside the shaft $e^1$ caused to rotate by a belt running on the pulley $e^2$, and on the end of which shaft is a chuck, *g*, having jaws $g^1$ pivoted at $g^2$. The inner end of the sleeve $f^4$ is, or may be, conical, and when forced inward presses the rear ends of the jaws $g^1$ outward and their front ends inward, so that they will pinch and hold the rod *e*, holding it stationary longitudinally, and causing it to rotate with the shaft $e^1$. When the sleeve *d* moves inward, the jaws $g^1$ $g^1$ are open, so that the action of the sleeve *d* is not interfered with, and so that this inward movement of the sleeve *d* feeds inward the rod *e*, causing it to project from the mouth of the chuck *g* just the right length to form a screw. The sleeve $f^4$ now moves inward and causes the jaws $g^1 g^1$ to grasp and hold the rod *e*, so that when the sleeve *d* moves outward it cannot carry the rod *e* with it, and also causing the rod *e* to rotate with the shaft $e^1$, so that it can be operated on to make a screw. There is a tool-carriage, *h*, having a reciprocating motion longitudinally upon the base *a*, in ways. Its reciprocating movement is given by the cam $h^1$ on the shaft *b* engaging with the wing $h^2$ on the side of the tool-carriage. The nature of this reciprocation will be understood from the description given hereinafter of the purpose it serves. On the tool-carriage is the turret $h^3$, which can rotate on the carriage. This rotation is an intermittent step-by-step movement, to bring the tools attached to the turret, one at a time, into position for operating on the end of the rod *e* and forming a screw. It is attained by means of a pawl and ratchet, one of which is attached to the turret, and the other to the base, as is common in screw-machines. In the drawings but two tools are shown attached to the turret—the forming-tool *n*, which cuts down the body of the rod *e* to the proper diameter of the screw, and the screw-cutting die within the half-clutch *m*, which cuts the thread upon the screw. The half-clutch *m* is upon the shaft *o*, which runs through the turret, and can turn freely in it, except when the carriage and turret are moved toward the chuck *g* when the half-clutch *p*, fast on the turret, engages with the half-clutch *m* and holds it stationary, rotarily, to cut the thread upon the screw.

When the thread has been cut, the die is run off the thread in a novel manner. Overlying the rear end of the shaft $o$ is a shaft, $r$, driven by a belt on the pulley $r^1$, and rotating faster than the shaft $e^1$. On the shaft $r$ is a friction-roll, $r^2$. The shaft $r$ is hung in loose or spring bearings, so that it may have some little play toward and from the shaft $o$. A cam, $s$, on the shaft $b$ at the proper time operates the lever $s^1$, pivoted at $s^2$, and engaging with the shaft $r$, so that the shaft $r$ is slightly depressed, bringing the friction-roll $r^2$ into contact with the friction-roll $o'$ upon the shaft $o$, thus causing the shaft $o$ and screw-cutting die to revolve in the same direction with, but faster than, the shaft $e^1$ and rod $e$, so that the screw-cutting die is run off the thread it has just cut by means of its acceleration of speed over the speed of the rod $e$. The cutting-off tool $t$, attached to the tool-block $t^1$, moving back and forth transversely on the base $a$, its forward movement given by the cam $t^2$ on the shaft $b$, and its return movement given by the spring $t^3$, now comes forward and cuts off the screw-blank from the rod $e$, and the machine is ready to go through the operation of making another screw.

The operations of feeding the rod $e$, of rotating the turret, and of bringing up and carrying back the cutting-off tool have heretofore been performed by hand.

I claim as my invention—

1. In combination with the revolving chuck $g$, having jaws $g^1 g^1$, the inner and outer sleeves $d f^4$, the former by intermittent reciprocating motion, produced by the cam $c$, or its equivalent feeding the stock, and the latter by similar motion produced by cam $f$, or its equivalent, alternately opening the jaws $g^1 g^1$ to permit the passage of the stock, and closing them to hold the stock, all substantially as described.

2. The combination of the rotating tool-bearing turret $h^3$, carriage $h$, cam $h^1$, the cutting-off tool $t$, tool-stock $t^1$, and cam $t^2$, all operating automatically, and all constructed, arranged, and designed for operation and use substantially as shown and described.

3. The combination of the turret $h^3$, shaft $o$, friction-roll $o'$, the friction-roll $r^2$, the lever $s^1$, and the cam $s$, or its equivalent, the whole constructed, arranged, and designed for operation and use substantially as set forth.

CHRISTOPHER M. SPENCER.

Witnesses:

WM. EDGAR SIMONDS,

JOHN POLLITT.